US007352702B2

(12) United States Patent
Rosier

(10) Patent No.: US 7,352,702 B2
(45) Date of Patent: Apr. 1, 2008

(54) METHOD FOR TRANSMITTING DATA BETWEEN AT LEAST ONE TRANSMITTER AND AT LEAST ONE RECEIVER, TRANSMITTER, RECEIVER, AND TRANSMISSION SYSTEM THEREOF

(75) Inventor: Corinne Rosier, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1001 days.

(21) Appl. No.: 09/998,633

(22) Filed: Dec. 3, 2001

(65) Prior Publication Data

US 2002/0080792 A1 Jun. 27, 2002

(30) Foreign Application Priority Data

Dec. 22, 2000 (FR) .................................. 00 17005

(51) Int. Cl.
*H04L 12/56* (2006.01)
(52) U.S. Cl. ........................................ 370/236; 370/394
(58) Field of Classification Search ................ 370/394, 370/389, 278, 412, 231, 235, 252; 340/572.1–572.9, 340/568.1
See application file for complete search history.

(56) References Cited

U.S. PATENT DOCUMENTS

| 5,754,754 | A | * | 5/1998 | Dudley et al. ................ 714/18 |
| 5,872,777 | A | | 2/1999 | Brailean et al. |
| 6,496,481 | B1 | * | 12/2002 | Wu et al. .................... 370/242 |
| 6,611,515 | B1 | * | 8/2003 | Balachandran et al. ...... 370/349 |
| 6,778,501 | B1 | * | 8/2004 | Malmgren et al. .......... 370/236 |
| 6,857,096 | B1 | * | 2/2005 | Braneci et al. .............. 714/751 |
| 6,948,108 | B1 | * | 9/2005 | Ludwig et al. .............. 714/748 |

OTHER PUBLICATIONS

Li et al, Automatic Repeat Requiest (ARQ) Mechanism in HIPERLAN/2, IEEE, pp. 2093-2097, 2000.*
Zorzi et al, Throughput of selective-repeat ARQ with time diversity in Markov channels with unrealiable feedback, J.C. Baltzer AG, Science Publisher, pp. 63-75, 1996.*
Yoshioka et al, Automatic Repeat Request Schemes for High-Speed Wireless Access Systems with Constraints of Finite Control Channel Quality, IEEE, pp. 447-451, 1999.*
ETSI TS 101 761-1 V1.1.1, pp. 1-87, 2000.*
G. M. Brown, et al., Computer Communication Review, Association for Computing Machinery, vol. 19, No. 4, XP-000133117, pp. 128-135, "Block Acknowledgement: Redesigning the Window Protocol", Sep. 1, 1989.

* cited by examiner

*Primary Examiner*—Frank Duong
(74) *Attorney, Agent, or Firm*—Oblon, Spivak, McClelland, Maier & Neustadt, P.C.

(57) ABSTRACT

This invention relates to a method for transmitting data between at least one transmitter and at least one receiver, in the form of packets of at least one data item, each of said packets being associated with an identifier of said packet, said receiver periodically sending a feedback message to said transmitter, comprising at least one bitmap block associated with a predetermined number of data packets having consecutive identifiers, so as to selectively inform said transmitter of a state of acknowledgement (acknowledged or unacknowledged) of each of said data packets of said block.

According to the invention, this method comprises at least one step of associating at least one timer with at least some of said bitmap blocks.

19 Claims, 6 Drawing Sheets

METHOD FOR TRANSMITTING DATA BETWEEN AT LEAST ONE TRANSMITTER AND AT LEAST ONE RECEIVER, TRANSMITTER, RECEIVER, AND TRANSMISSION SYSTEM THEREOF

BACKGROUND OF THE INVENTION

1. Field of the Invention

This invention relates to the field of data transmission between a transmitter and a receiver. More precisely, the invention relates to all communication systems requiring high data transmission quality, and is of special interest for communication systems subject to real time constraints.

In particular, but not exclusively, the invention is applied to ARQ (Automatic Repeat Request) type transmission protocols, which implement error-checking functions within communication systems. Such ARQ protocols define a set of data transmission rules, structured in successive frames, as packets.

2. Related Background Art

Many error-checking techniques are generally used in communication systems to compensate for loss and/or degradation of data transmitted from a source point to a destination point. Conventionally, the error checking implements transmission error detection and retransmission of lost or degraded data. According to a known data retransmission technique, the transmitter waits until it has received an explicit discard message from the receiver for data lost or degraded during transmission, in the form of a feedback message, then retransmits as soon as possible the data unacknowledged by the receiver.

SUMMARY OF THE INVENTION

The invention is applied in particular as part of the ARQ error detection and retransmission protocol of the HiperLAN/2 (High Performance Local Area Network Type 2) standard defined by ETSI (European Telecommunications Standards Institute) in ETSI standard TS 101 761-1 V1.1.1 (2000-04) entitled Broadband Radio Access Network (BRAN); HiperLAN Type 2; Data Link Control (DLC Layer) Part 1: Basic Data Transport Functions).

The HiperLAN/2 communication standard, also called H/2, defines a high-speed low-range radio access system, and is advantageously applied to wireless local area networks, and wireless access networks. H/2 is a cellular system wherein each radio cell is controlled by an access point, called AP, covering a given geographical area, and handling radio resource distribution among the various mobile terminals (called MT) of the system. H/2 provides three types of transmission, i.e. uplink, downlink, and direct link transmission.

The HiperLAN/2 ARQ protocol is an ARQ protocol of the "Selective Repeat" type, having several additional mechanisms. The following is a description of the general principle of this protocol.

An identifier, also called sequence number, is inserted by the ARQ transmitter into each user data packet, also called U-PDU (User Protocol Data Unit), transmitted to the ARQ receiver. This identifier has a 10-bit length, and is incremented by 1 modulo $2^{10}=1024$.

Hereafter, the term PDU will designate a U-PDU type user data packet.

The transmitter maintains a list of the sequence numbers it is allowed to transmit, and the receiver maintains a list of the sequence numbers it is prepared to receive. Each of these lists is designed as a PDU window. The sequence number activates the receiver to detect a PDU loss, or the reception of a damaged PDU, and to inform the transmitter thereof via a feedback message. The transmitter then performs a retransmission of the PDUs incorrectly received by the receiver.

A PDU window is characterized by the variable BoW (Bottom of Window), on the one hand, and by its size $K_s$, on the other hand.

On the transmitter side, BoW is the smallest sequence number associated with a PDU that has not yet been positively acknowledged by the receiver. $K_s$ is then the maximum number of PDUs that can be sent and stored in the window waiting for acknowledgement.

On the receiver side, BoW is the smallest sequence number associated with a PDU that has not yet been received properly by the receiver. $K_s$ is then the maximum number of PDUs that can be accepted and stored in the receive window, before one of these PDUs is transmitted to a higher layer.

In addition to the sequence number, the ARQ receiver or transmitter maintains an acknowledge state variable for each PDU of the window indicating whether the PDU has been received properly or not.

In the HiperLAN/2 ARQ protocol, each data packet, or PDU, of a receive window is acknowledged selectively within a bitmap block, or by a cumulated feedback message if all the PDUs preceding or surrounding the PDU under consideration in the window, including the considered PDU itself, have been received properly.

This bitmap block is associated with a predetermined number of PDUs (8 for HiperLAN/2) having consecutive sequence numbers. This association is performed as follows: the sequence number space, starting at sequence number 0, is divided into consecutive sequence number intervals, each interval being associated with a given bitmap block. A given marker bit within a bitmap block is associated with the sequence number having the same position within the associated interval of sequence numbers. Thus, a binary value of 1 within a bitmap block indicates that the PDU, the sequence number of which is associated with the bit involved, is acknowledged positively. Conversely, a binary value of 0 within a bitmap block indicates a negative acknowledgement of the corresponding PDU.

The bitmap block number corresponds to the position occupied by the interval of sequence numbers with which it is associated, within the sequence number space. A feedback message can transport up to three distinct bitmap blocks.

The ARQ link established between the transmitter and the receiver is moreover characterized by the total duration of an operating cycle, also called RTT (Round Trip Time). The RTT duration can be defined as the sum of the time the ARQ transmitter requires for sending a PDU, the time the ARQ receiver requires for receiving, processing, and sending a reply to the transmitter as a (positive or negative) feedback message, and the time the transmitter requires for analysing this feedback message and reading the receiver's reply therefrom regarding the PDU involved.

As part of HiperLAN/2, the receiver's reply regarding the acknowledgement of a PDU received can be delayed until a certain number of PDUs have been received, or can be delayed unintentionally by the receiver if no resource is available for transmitting it. Therefore, the RTT duration varies for a given ARQ link.

This RTT duration moreover depends on the ARQ class of the transmitter and the receiver of the ARQ link involved. It is recalled that the ARQ processing time of a transmitter is equal to the minimum number of frames passing before the transmitter can transmit PDUs in response to receiving a feedback message from the receiver. Also, the ARQ processing time of a receiver is equal to the minimum number of frames passing before the receiver can transmit a feedback message in response to receiving one or more PDUs. The ARQ delay classes defined in HiperLAN/2, having a value of 0, 1, 2, or 3, have a direct impact on the processing times of a given ARQ entity (for transmit and receive). Delays have the same value as the class.

Moreover, each ARQ entity states its ARQ class when transmitting and receiving during a so-called association period, within the H/2 network. Thus, each ARQ entity, on both sides of a transmission path, can determine the likely RTT minimum value, as well as the RTT upper limit that should normally not be reached.

A disadvantage of the known data transmission techniques implementing a retransmission of lost or degraded data upon explicit acknowledgement, is that they offer no adequate solutions in case a feedback message is lost or degraded.

Indeed, when a feedback message is lost or degraded, the transmitter does not know which PDUs to retransmit. It must therefore wait to correctly receive a new feedback message, replacing the lost one, containing all or part of the acknowledge data of the lost message, in order to implement the mechanism of retransmitting the unacknowledged data.

Moreover, if the data exchange protocol does not allow the transmitter to request a specific feedback message or bitmap block, as is the case for instance in the HiperLAN/2 ARQ protocol, the transmitter is unable to predict the time when it will receive the expected feedback message.

This disadvantage can be a problem when the contents of the feedback message are very important to the transmitter, especially if the feedback message contains information required by the transmitter for moving the window of PDUs to be transmitted.

For certain applications requiring high-speed data transmission, and in particular for applications subject to real time constraints, the transmitter can make the decision, in case of non receipt or late receipt of a feedback message, not to retransmit the unacknowledged PDUs. In particular, the object of this discard phenomenon is to prevent the transmitter from retransmitting data that would be useless to the receiver, because they would be received too late to be taken into account.

Conversely, still e.g. as part of a delay-sensitive radio transmission, a late retransmission of PDUs previously received improperly can also lead to the implementation of a discard mechanism, this time on behalf of the receiver.

This data loss at the receiver implies a quality degradation of the application implemented at the receiving end, in particular when this application is especially sensitive to both data loss and delay.

Another disadvantage of certain prior art techniques, and in particular of the HiperLAN/2 ARQ protocol, is that they offer no solution to cope with possible operating inconsistencies at the receiver. Thus, according to the H/2 standard, as the way the receiver transmits feedback messages, and the choice of their contents (especially the choice of the bitmap blocks they contain) are not standardized, certain bitmap blocks can be transmitted with a very long delay, and in the worst case scenario, even never be transmitted.

DETAILED DESCRIPTION

Figure 1:
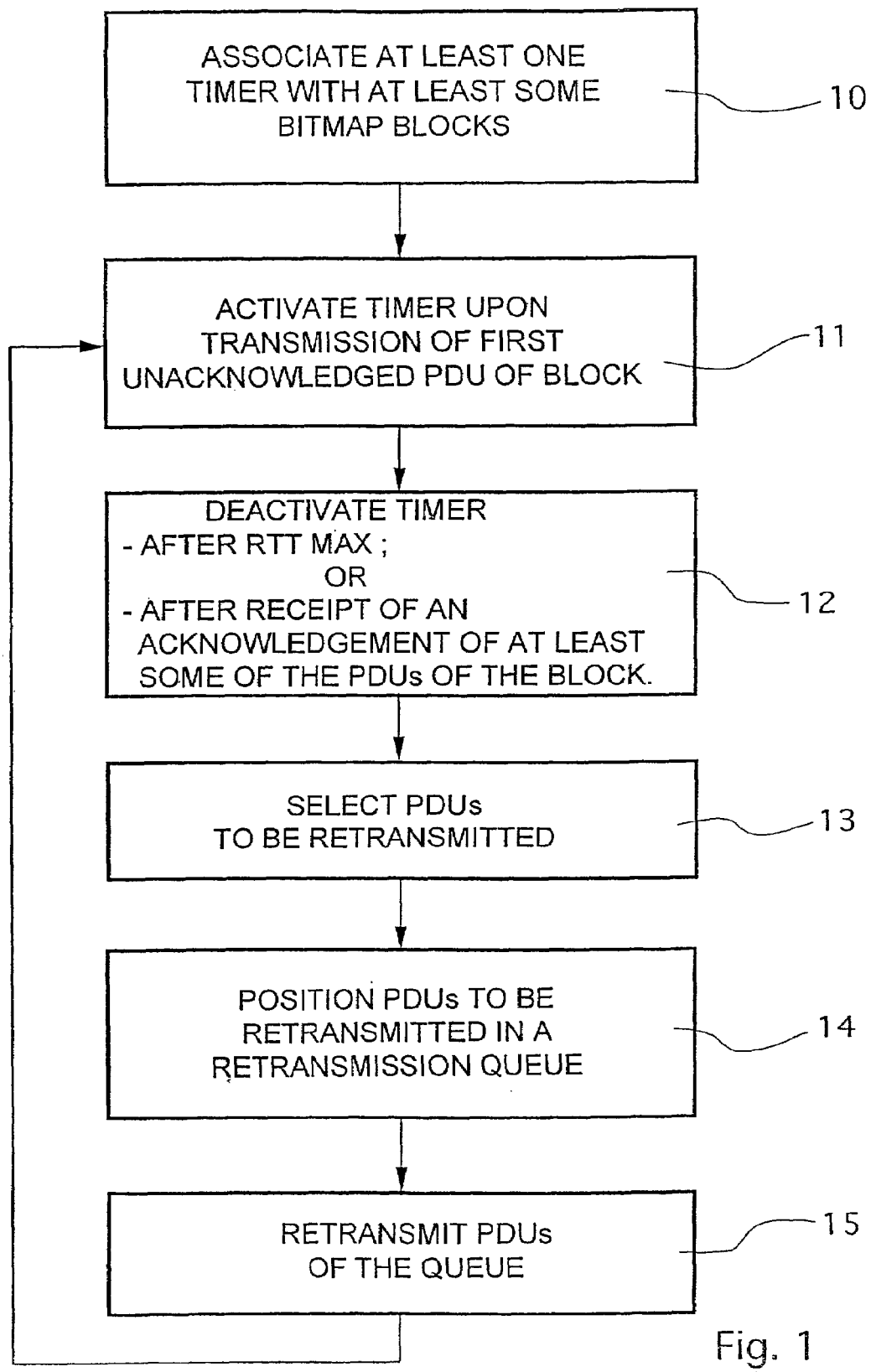
FIG. 1 shows a block diagram of the various steps implemented according to the basic inventive mechanism as part of data packet exchanges between an ARQ transmitter and receiver.

In particular, the object of the invention is to compensate for these disadvantages of prior art.

More precisely, it is an object of the invention to provide a data transmission technique implementing error detection and retransmission of lost or damaged data, offering an optimised solution to the problem of a feedback message getting lost or degraded.

It is also an object of the invention to implement a data transmission technique making it possible to compensate for the disadvantages of prior art techniques according to which, on the one hand, the transmitter does not have specific means for requesting a specific feedback message or bitmap block, and, on the other hand, it can be confronted with possible operating inconsistencies of the receiver.

It is another object of the invention to implement a data transmission technique, especially but not exclusively adequate for the ARQ protocol, in particular for the Hiper-LAN/2 standard.

Furthermore, it is an object of the invention to provide a data transmission technique allowing anticipated retransmission of unacknowledged data packets, in case a feedback message is lost or degraded.

It is also an object of the invention to implement a technique for communicating between a transmitter and a receiver with high transmission quality.

As part of ARQ-type protocols, it is another object of the invention to avoid untimely implementation of the discard mechanism, in particular envisaged by the HiperLAN/2 standard.

The above objects as well as others that will be apparent hereafter, are achieved by means of a method for transmitting data between at least one transmitter and at least one receiver, in the form of packets of at least one data item, each of said data packets being associated with an identifier of said packet, said receiver periodically sending to said transmitter a feedback message comprising at least one bitmap block associated with a predetermined number of data packets having consecutive identifiers, so as to selectively indicate to said transmitter a state of acknowledgement (acknowledged or unacknowledged) of each of said data packets of said block.

According to the invention, this transmission method comprises at least one step of associating at least one timer with at least some of said bitmap blocks, determining a timeout period beyond which a specific operation is to take place, if no acknowledgement has been received.

Thus, the invention is based on a totally innovative and inventive data retransmission approach as part of a communication protocol based on error detection and retransmission of lost or damaged data. Indeed, the principle of conventional transmission protocols is based on the implementation of a data retransmission mechanism in response to receiving a feedback message indicating that certain PDUs have not been received correctly. According to the invention, the association of a timer with some bitmap blocks makes it possible to implement anticipated data retransmission, prior to receiving a corresponding feedback message.

It will be noted that a bitmap block is associated with a predetermined number of data packets, which can be fixed or variable, but is known to the transmitter for the whole duration of the communication with the receiver.

Associating a timer with a bitmap block clearly appears to be a resource intensive mechanism, but advantageously allows to improve the quality of service provided at the receiving end. Therefore, the invention contradicts the prejudices of those skilled in the art, who consider that the quality of service provided is related to maximizing data transmission throughput, and who consider the resources of a communication system are therefore to be saved.

Advantageously, for a given bitmap block, this method comprises a first step of activating said timer, when said transmitter sends to said receiver the first of said data packets of consecutive identifiers associated with said block, so that the timer switches to said activated state.

Triggering the timer associated with a given bitmap block therefore occurs as soon as the first of the PDUs associated with this block is sent, i.e. when the PDU of the block having the smallest sequence number is sent.

According to an advantageous characteristic of the invention, for a given bitmap block, this method comprises a first step of deactivating said timer after a predetermined maximum duration, and said data packets of said block are then considered by said transmitter in said unacknowledged state.

As part of the H/2 ARQ protocol, this predetermined maximum duration corresponds to the maximum round trip time RTTmax. Thus, when the timer indicates that a time greater than or equal to RTTmax has elapsed since the transmission of the first PDU associated with the block, and when no corresponding feedback message has been received for this block, the transmitter then considers that a transmission error may have occurred, and that the corresponding PDUs are in principle unacknowledged. The timer is deactivated automatically when RTTmax times out.

According to a second advantageous characteristic of the invention, for a given bitmap block, this method comprises a second step of deactivating said timer when said transmitter receives a cumulated acknowledgement at least of said data packets of said block, indicating that said data packets of said block are in said acknowledged state.

Therefore, if for instance the receiver sends a feedback message indicating that all PDUs with sequence numbers comprised between 0 and 10 have been received correctly, upon receipt of this cumulated feedback message by the transmitter, the timer associated with bitmap block 0, corresponding to PDUs 0 to 7, is then deactivated.

According to a third advantageous characteristic of the invention, for a given bitmap block, this method comprises a third step of deactivating said timer, when said transmitter receives a feedback message comprising at least said bitmap block.

Preferably, upon receipt by the transmitter of said feedback message, this method implements a step of analysing said feedback message, in order to determine said acknowledged or unacknowledged state of each of said data packets of said block.

As part of the H/2 ARQ protocol, if such a feedback message comprises e.g. a single bitmap block, the transmitter then starts to read the values 0 and 1 of the 8 consecutive bits of this block. A 0 value bit indicates that the PDU, the sequence number of which is equal to the position of this bit, is in unacknowledged state.

As part of an ARQ protocol, during this step of analysing a bitmap block, the transmitter only considers PDUs whereof the sequence number is comprised in the current transmission window, i.e. between BoW and $BoW+K_s$, according to the terms previously used in this document.

Advantageously, at the end of said step of deactivating said timer, at least one data packet of said block being in said unacknowledged state, a step of positioning at least some of said unacknowledged data packets of said block in a retransmission queue is implemented.

This retransmission queue can be a physical queue, e.g. in the form of a buffer, wherein PDUs waiting for retransmission are stored. Positioning a PDU into the queue can also consist in associating therewith a retransmission flag, which is up when the PDU is to be retransmitted, and down otherwise. More generally, positioning a PDU in the retransmission queue can consist in indicating that it is in a specific state prior to retransmission via any suitable technique.

As described before, the PDUs associated with a 0 value bit in the bitmap block received, but the sequence number of which is greater than $BoW+K_s$, also called EoW (End of Window) are not taken into account during the step of analysing the feedback message, and therefore are not positioned in the retransmission queue.

According to an advantageous alternative of the invention, at the end of said analysing step, this method implements a step of checking the presence, in said retransmission queue, of at least one acknowledged data packet of said block, and, when the presence in said queue of at least one acknowledged data packet of said block has been confirmed, it implements a step of deleting said acknowledged data packet(s) of said block from said retransmission queue.

Thereby, superfluous retransmission of positively acknowledged PDUs is avoided. This technique is particularly interesting when, e.g. a timer has timed out after a RTTmax duration, some PDUs of the corresponding block have been prepared for retransmission, and a feedback message, positively acknowledging some of the PDUs ready for retransmission, is then received by the transmitter, before the latter has been able to perform retransmission of the PDUs placed in the queue. The transmitter can then decide to remove from the queue the PDUs that have been positively acknowledged by the receiver.

According to an advantageous technique of the invention, this method implements at least one step of retransmitting said data packet(s) of said block positioned in said retransmission queue, and a second step of activating said timer of said block when the first of said data packets of said block positioned in said queue is retransmitted.

Thus, the PDUs of the queue that have not been acknowledged by the receiver are retransmitted and the timer is triggered again when the PDU with the smallest sequence number of the associated block is retransmitted.

Preferably, this transmission method implements an ARQ (Automatic Repeat Request) type protocol.

This ARQ protocol can be for instance of the Selective Repeat, or Go Back N type. In particular, the invention is applied as part of the ARQ SRPB (Selective Repeat with Partial Bitmap) protocol of the HiperLAN/2 standard.

According to a preferred embodiment of the invention, this transmission method furthermore comprises at least one time stamping step of associating a time stamp with at least some data packets in said unacknowledged state.

This time stamp can be expressed in frames, or any other time measuring unit, and in particular in milliseconds. As part of the H/2 ARQ protocol where frames have a fixed duration of 2 ms, expressing the value of a time stamp in milliseconds allows for better precision, in comparison with expressing the measurement in frames.

Preferably, said time stamp is activated when said transmitter sends said associated data packet.

Consequently, the time stamp allows the time that has elapsed since a PDU has been transmitted to be evaluated at any time.

According to another advantageous technique of the invention, said positioning step comprises a preliminary sub-step of selecting data packets to be positioned in said queue, depending on at least one predetermined selection criterion.

Preferably, said selection criterion takes into account at least one piece of the information belonging to the group composed of:

the value of said time, stamp associated with a unacknowledged data packet of said block;

the ARQ class of said receiver.

Indeed, the value of a time stamp and the ARQ class of the receiver are indicators, respectively, of the time that has elapsed since the corresponding PDU has been transmitted, and the time required by the receiver for processing the PDU and transmitting a corresponding feedback message. Taking into account either of these two criteria, or both criteria at the same time, the transmitter can make a subtle decision as to whether it is necessary or not to position the PDU under consideration in a retransmission queue.

According to a special embodiment of the invention, said selection sub-step allows to select said unacknowledged data packet(s) of said block, associated with a time stamp having a greater value than said predetermined maximum duration.

Indeed, if a time stamp indicates that the PDU under consideration has been transmitted since a time greater than RTTmax, a missing corresponding feedback message can be considered by the transmitter as tantamount to a likely transmission error.

Advantageously, said positioning step further comprises for each of said selected data packets a sub-step of deactivating said associated time stamp.

As soon as a PDU is placed in the retransmission queue, its time stamp is thus deactivated.

According to a first preferred embodiment of the invention, when all unacknowledged data packets of said block have been selected in said selection sub-step, said time stamp takes the following value V(T) during said second activation step:

$$V(T)=t(\text{activation})+d_{max},$$

where t(activation) is the current time value during said second activation step, and where $d_{max}$ is said predetermined maximum duration, and the time stamp associated with each data packet of the block positioned in said queue is activated and takes the current time value during said retransmission of said data packet.

The $d_{max}$ duration, also designated as RTTmax, can be expressed in frames, or e.g. in milliseconds. In the former case, and for frames lasting e.g. 2 ms, the equation above is then written as: $V(T)=t(\text{activation})+d_{max}*2$, with V(T) and t(activation) being expressed in milliseconds.

According to a second preferred embodiment of the invention, at the end of said first step of deactivating said timer, if at least one unacknowledged data packet of said block, associated with a time stamp having a value of less than said predetermined maximum duration, has not been selected during said selection sub-step, this transmission method implements a third step of activating said timer of said block, so that said timer takes the following value V(T):

$$V(T)=V(\text{run})+(\text{Time stamp}[i]-\text{Time stamp}[j]),$$

where V(run) is the value of said timer during said step of said timer running in said deactivated state, Time stamp[j] is the greater of said time stamps associated with said unacknowledged data packets of said block selected during said selection sub-step, and Time stamp[i] is the greater of the values of said time stamps associated with said unacknowledged data packets of said block that have not been selected during said selection sub-step.

Thus, when a timer has timed out, if at least one PDU of the block, which has been transmitted but not yet acknowledged, is not involved in retransmission, because its time stamp value is too low, the timer is immediately reactivated according to the equation above. This equation can also be written as $V(T)=V(\text{run})+(\text{Time stamp}[i]-\text{Time stamp}[j])*2$ when the time stamp value is expressed in frames, and these frames have a duration of 2 ms. V(T) and V(run) are then expressed in milliseconds.

In case several PDUs have the same time stamp value Time stamp[i] or Time stamp[j], it can be envisaged to choose any of these values from the equation above.

Advantageously, at the end of said step of analysing said feedback message, the said method implements, for each of said acknowledged data packets of said block, a step of deactivating said associated time stamp.

According to a third preferred embodiment of the invention, at the end of said third step of deactivating said timer, if at least one unacknowledged data packet of said block has not been selected during said selection sub-step according to a decision criterion related to the ARQ class of said receiver, this transmission method implements a fourth step of activating said timer of said block, so that said timer takes the following value V(T):

$$V(T)=V(\text{run})+(d_{max}-(t-\text{Time stamp}[i])),$$

where V(run) is the value of said timer during said step of said timer running in said deactivated state, $d_{max}$ is said predetermined maximum duration, t is the current time value, and Time stamp[i] is the greater of the values of said time stamps associated with said unacknowledged data packets of said block that have not been selected during said selection substep.

As described before, the above equation can also be written as:

$$V(T)=V(\text{run})+(d_{max}*2-(t-\text{Time stamp}[i]))$$

when $d_{max}$ is expressed in frames, one frame lasting 2 ms, and t and Time stamp[i] are expressed in milliseconds. The equation can also be written as $V(T)=V(\text{run})+(d_{max}-(t-\text{Time}$ stamp[i]))*2 if $d_{max}$ and Time stamp[i] are expressed in frames lasting 2 ms, and if t designates the current frame number.

If several PDUs have the same time stamp value, any of these values can be chosen from the equation above.

The invention also relates to a transmitter, a receiver, and a data transmission system implementing the data transmission method described previously.

Figure 2:
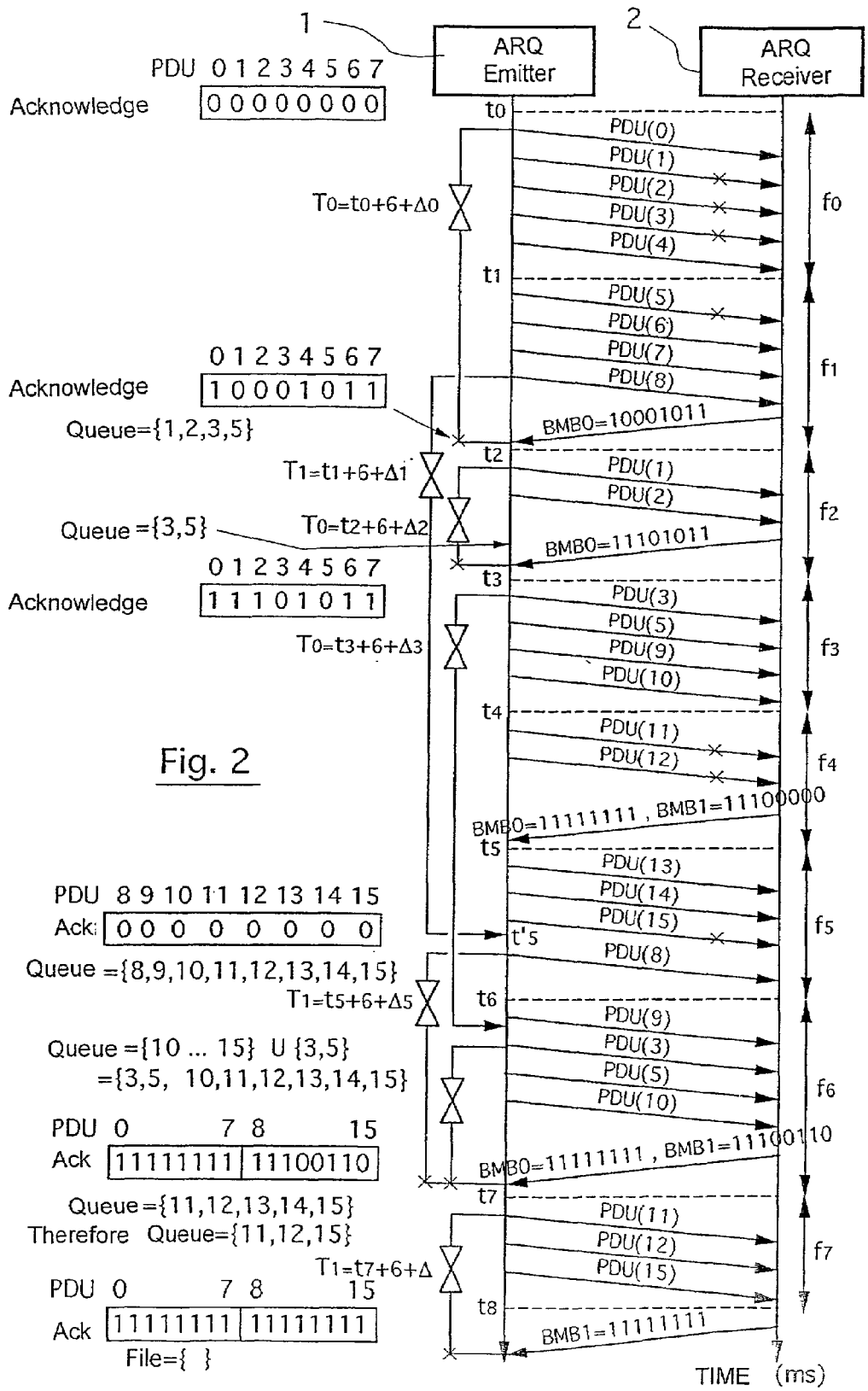
FIG. 2 shows the PDU exchanges between an ARQ transmitter and receiver, when a timer is associated with each of the bitmap blocks according to the method of FIG. 1.
Figure 3:
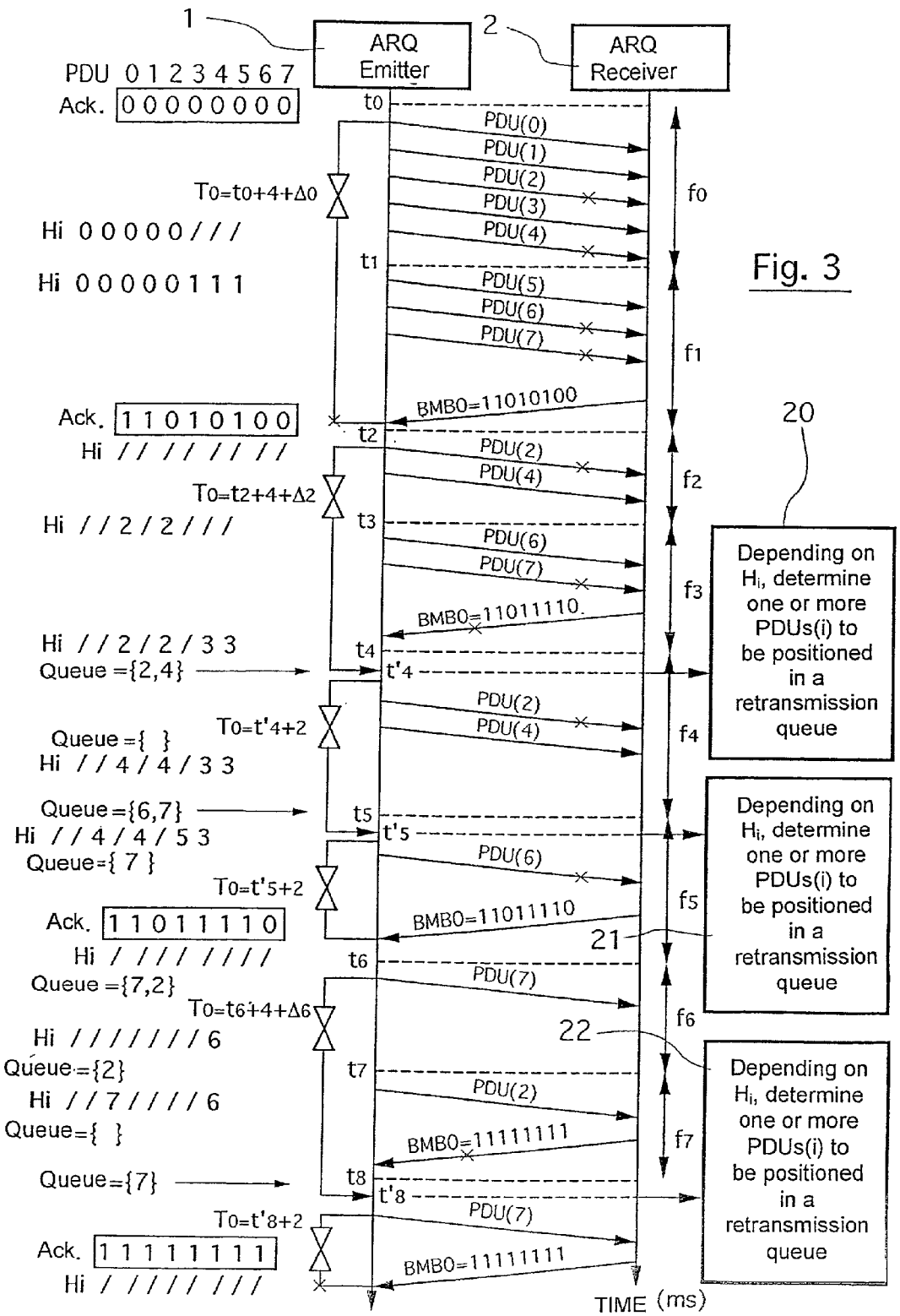
FIG. 3 shows a development of the embodiment of FIG. 2, according to which a time stamp is associated with the unacknowledged PDUs exchanged between the ARQ transmitter and receiver.
Figure 4A:
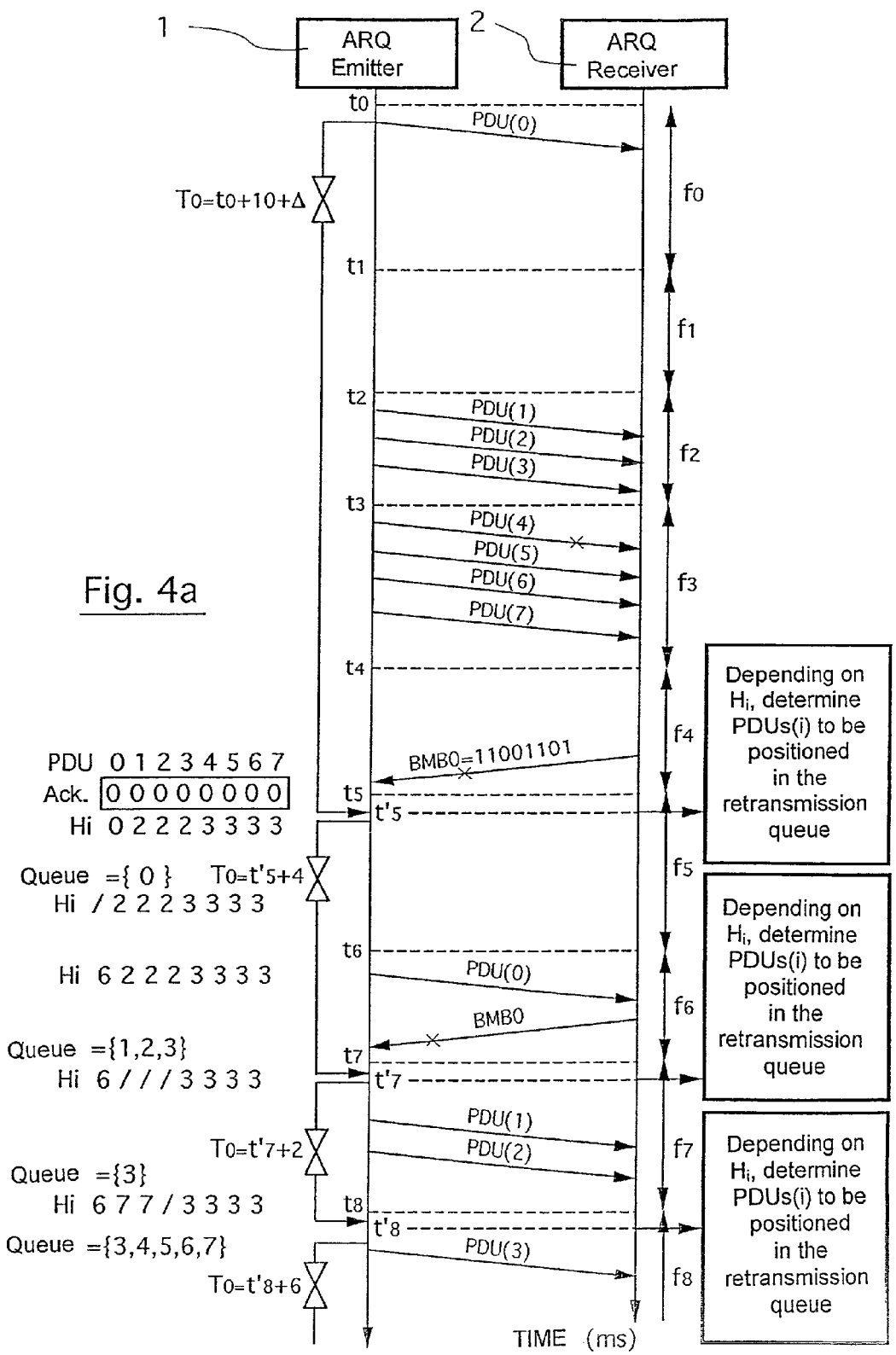
FIGS. 4a and 4b describe PDU exchanges between an ARQ transmitter and an ARQ receiver according to an embodiment similar to that of FIG. 3, with a different RTTmax value corresponding to the maximum duration of one operating cycle.
Figure 4B:
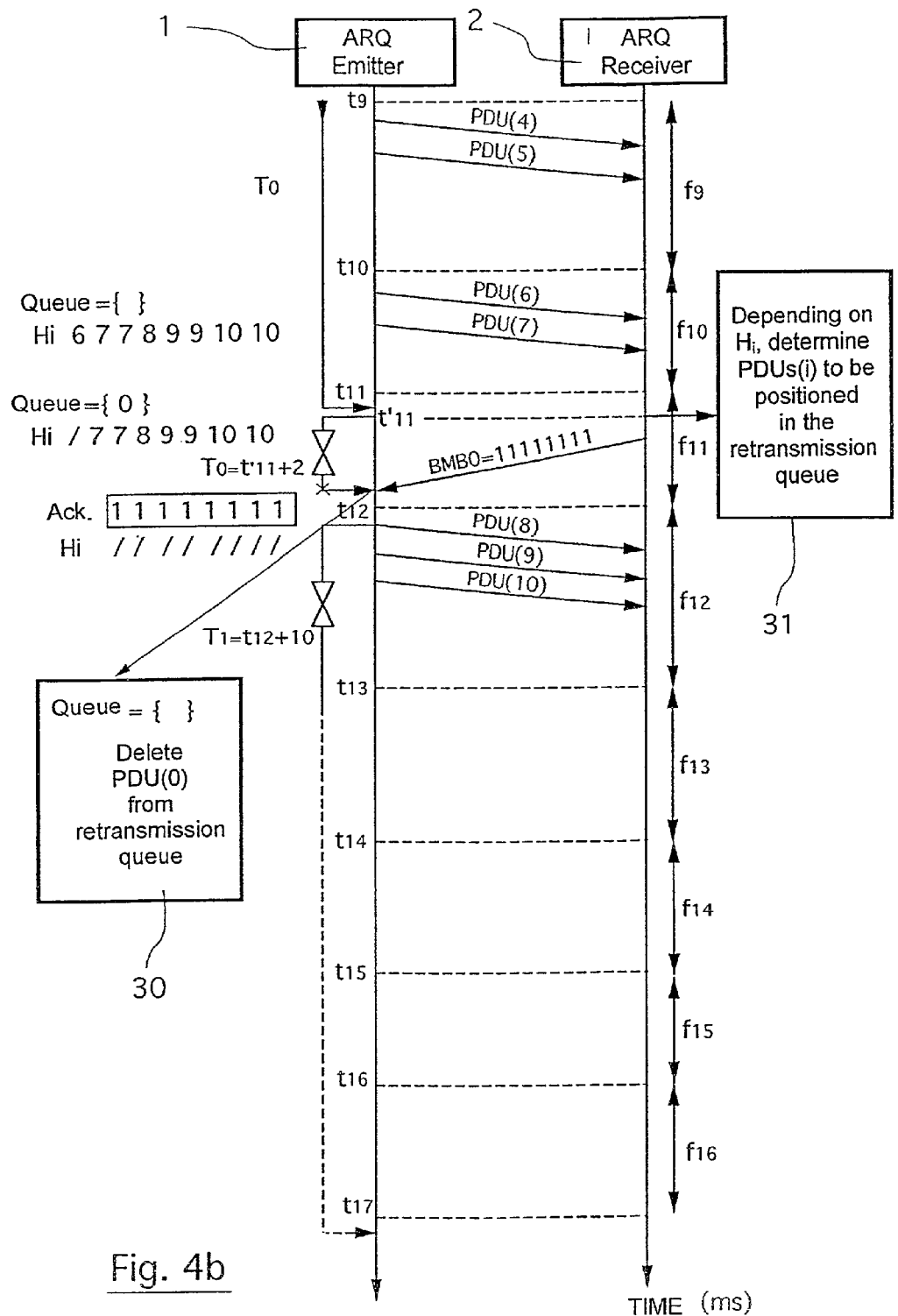

Other features and advantages of the invention will be more apparent from reading the following description of a preferred embodiment, provided by way of example only and not to be restrictive, and the appended drawings, where:

It will be noted that FIGS. 2 to 4 can illustrate the special case of an ARQ transmitter located in access point AP, and a receiver located in a mobile terminal MT. If a communication between two terminals in direct mode is considered, wherein both terminals are then transmitting during the same phase, FIGS. 2 to 4 can also illustrate the special case where the first terminal transmitting in the frame is the ARQ transmitter and where the second terminal transmitting in the frame is the ARQ receiver for the communication under consideration.

The general principle of the invention is based on associating a timer with at least some bitmap blocks transmitted by the receiver to the transmitter.

In the course of this document, we will set out to describe an embodiment of the invention as part of the ARQ SRPB (Selective Repeat with Partial Bitmap) protocol of the HiperLAN/2 standard. It is recalled that, of course, the invention is also applicable to other types of data transmission protocols, based on error detection at the time of transmission and on retransmission of lost or damaged data.

Referring to FIG. 1, the various implementation steps according to the basic inventive mechanism will be described briefly as part of the PDU exchanges between an ARQ transmitter and receiver. These steps will be described more in detail with reference to FIGS. 2 to 5.

During a step referenced as 10, according to the method of this invention, at least one timer is associated with some or all of the acknowledgement blocks, also called bitmap blocks, that an ARQ receiver is likely to transmit to an ARQ transmitter, within a feedback message. According to the ARQ protocol of the HiperLAN/2 standard, such a bitmap block is associated with 8 consecutive PDUs, and activates the selective acknowledgement of each of these PDUs.

The timer is activated during a step referenced as 11, during the transmission of the first of the consecutive PDUs associated with the block under consideration. It is then deactivated during a later step referenced as 12, after a predetermined maximum duration has expired or upon receipt of an acknowledgement of at least some of the PDUs of the block under consideration.

When the timer is deactivated, the ARQ transmitter implements a step 13 of selecting the possible unacknowledged PDU(s) to be retransmitted to the ARQ receiver, then positions 14 the selected PDUs in the retransmission queue.

When the first PDU of the block, wherewith the timer is associated, positioned at the end of the queue, is retransmitted 15 the corresponding timer is reactivated 11.

Now, referring to FIG. 2, we are going to present an embodiment of handling the timers associated with the bitmap blocks sent by the receiver, as part of the PDU exchanges between a transmitter 1 and a receiver 2.

The PDU exchanges are organized in frames, designated $f_0$ to $f_7$ in FIG. 2. According to the ARQ protocol of the HiperLAN/2 standard, these frames last 2 ms.

It is considered that the transmitter and the receiver of FIG. 2 are of ARQ class 0, i.e.:

after having received in frame $f_i$ a message indicating the state of acknowledgement of several PDUs, the ARQ transmitter is able to retransmit in the same frame $f_i$ (or in the consecutive frame according to whether its transmission phase is before or after that of the receiver) the unacknowledged PDU(s), provided it has the required resources;

after having received one or more PDUs in frame $f_i$, the ARQ receiver is able to transmit to the transmitter, in the same frame $f_i$, (or in the consecutive frame according to whether its transmission phase is before or after that of the transmitter) one (or several) feedback message for the PDU(s) received if it has the required resources.

Furthermore, it is considered that the maximum duration of an operating cycle, hereafter called RTTmax (Round Trip Time), is equal to 3 frames.

First of all, we are going to examine the bitmap block associated with the PDUs of sequence numbers 0 to 7, which will hereafter be designated as $BMB_0$ (bitmap block). At the time to, which corresponds to the beginning of frame $f_0$, the value of $BMB_0$ is 00000000, indicating that the PDUs with sequence numbers 0 to 7 are all in unacknowledged state. According to the invention, a timer $T_0$ is associated with $BMB_0$.

In frame $f_0$, transmitter 1 sends the PDUs with sequence number 0 to 4 to receiver 2. Timer $T_0$ is activated at time $t_0+\Delta_0$, when the PDU with sequence number 0 is transmitted, designated as PDU(0). It will be deactivated at the latest after a RTTmax duration equal to 3 frames, i.e. 6 ms, as part of the HiperLAN/2 standard, i.e. that $T_0$ will be deactivated at the latest at time $t=t_0+6+\Delta_0$.

As indicated in FIG. 2, PDU(0) and PDU(4) have been received correctly by receiver 2. On the other hand, an incident (symbolized by a cross on the PDU transmission arrow) has occurred during transmission of PDU(1), PDU(2), and PDU(3).

In frame $f_1$, which starts at time $t_1$, transmitter 1 sends PDU(5), which is not received correctly, PDU(6), PDU(7), and PDU(8). When PDU(8) is transmitted, at time $t_1+\Delta_1$, transmitter 1 activates timer $T_1$ associated with $BMB_1$ corresponding to PDUs with sequence numbers 8 to 15. $T_1$ will be deactivated at the latest at time $t_1+6+\Delta_1$, after a duration equal to RTTmax.

When PDU(8) has been received, receiver 2 sends a feedback message to transmitter 1 containing $BMB_0$ with a value equal to 10001011. Upon receipt of $BMB_0$, transmitter 1 deactivates $T_0$, analyses the feedback message, and determines that PDU(1), PDU(2), PDU(3), and PDU(5) have not been acknowledged, and must therefore be retransmitted.

Frame $f_2$ starts at time $t_2$. Being of ARQ class 0, transmitter 1 retransmits PDU(1) and PDU(2) to the receiver 2, in frame $f_2$. During the retransmission of PDU(1), at time $t_2+\Delta_2$, timer $T_0$ associated with $BMB_0$ is reactivated, for a maximum duration equal to $t_2+6+\Delta_2$.

In the same frame $f_2$, transmitter 1 receives a feedback message from receiver 2 containing $BMB_0$, of value 11101011. It then deactivates timer $T_0$, analyses the feedback message, and determines that PDU(3) and PDU(5) are still in unacknowledged state and must therefore be retransmitted to receiver 2.

In frame $f_3$, transmitter 1 is assigned the resources required for transmitting PDU(3), PDU(5), PDU(9), and PDU(10). Again, when PDU(3) is transmitted at time $t_3+\Delta_3$, transmitter 1 activates $T_0$, for a maximum duration equal to $t_3+6+\Delta_3$.

In frame $f_4$, transmitter 1 has the resources required for transmitting PDU(11) and PDU(12), which receiver 2 receives improperly, as illustrated in FIG. 2. In the same frame $f_4$, receiver 2 sends a feedback message comprising $BMB_0$ and $BMB_1$. However, an incident occurs in the course of the transmission of this feedback message, which is not received by transmitter 1.

In frame $f_5$, transmitter 1 thus proceeds with transmitting PDU(13), PDU(14), and PDU(15). At time $t'_5$, timer $T_1$ expires after RTTmax, and therefore goes into deactivated state. Transmitter 1 then deduces therefrom that none of the PDUs associated with $BMB_1$ is in acknowledged state, and that all the PDUs associated with $BMB_1$ are therefore to be retransmitted. As there is still one resource available, and being of ARQ class 0, transmitter 1 thus starts to retransmit PDU(8) in the same frame $f_5$ at time $t_5+\Delta_5$, and then reactivates $T_1$, for a maximum duration of $t_5+\Delta_5+6$.

In frame $f_6$, transmitter 1 retransmits PDU(9). Again, timer $T_0$ goes into deactivated state, after RTTmax, specifying to transmitter 1 the unacknowledged state of PDU(3) and PDU(5). The retransmission queue maintained by transmitter 1 is then updated, in order to comprise the PDUs with the following sequence numbers: {3, 5, 10, 11, 12, 13, 14, 15}. Sorting the PDUs of the queue by ascending order of sequence numbers activates transmitter 1 to determine that it must retransmit, in frame $f_6$, PDU(3), PDU(5), then PDU(10). Timer $T_0$ is again reactivated during transmission of PDU(3). After the PDUs with sequence number 3, 5, and 10 have been retransmitted, the retransmission queue is updated and comprises the PDUs with the following sequence numbers: {11, 12, 13, 14, 15}.

After having correctly received PDU(10), receiver 2 sends a feedback message to transmitter 1 comprising $BMB_0=11111111$ and $BMB_1=11100110$. Upon receipt of this message, $T_1$ and $T_0$ are deactivated.

According to a particularly advantageous embodiment of the invention, transmitter 1 analyses the feedback message received, determines that PDU(13) and PDU(14) have been acknowledged by receiver 2, and deletes them from the retransmission queue, so that is now contains the PDUs with sequence numbers {11, 12, 15}.

In frame $f_7$, transmitter 1 thus retransmits PDU(11), PDU(12), and PDU(15). In frame $f_8$, receiver 2 transmits a feedback message comprising $BMB_1=11111111$, which, when received by transmitter 1, leads to deactivation of timer $T_1$.

All PDUs with sequence numbers 0 to 15 have then been acknowledged, and the retransmission queue maintained by transmitter 1 is now empty.

Referring to FIG. 3, we are now going to present a second embodiment of the invention, wherein, in addition to a timer being associated with each of the bitmap blocks, a time stamp is associated with each unacknowledged PDU.

Again, an ARQ class 0 transmitter and receiver are under consideration, but now, a RTTmax duration of 2 frames is considered, i.e. 4 ms for HiperLAN/2 where frames last 2 ms.

Again, we will examine frames numbered $f_0$ to $f_7$. A timer $T_0$ is associated with bitmap block $BMB_0$, associated with PDUs numbered 0 to 7. Also, a time stamp $H_i$ is associated with the PDU having sequence number i, the value of which is expressed in frames, and which is activated during transmission of PDU(i).

Thus, in FIG. 3, transmitter 1 sends the PDUs numbered 0 to 4 in frame $f_0$. At PDU(0) transmission time $t_0+\Delta_0$, $T_0$ is activated, which will be deactivated at the latest after a duration equal to RTTmax, i.e. at time $t_0+\Delta_0+4$. At the end of frame $f_0$, time stamps $H_0$ to $H_4$ are therefore activated and have a value of 0, and time stamps $H_5$ to $H_7$ are deactivated.

In frame $f_1$, transmitter 1 transmits PDUs numbered 5 to 7. Time stamps $H_5$ to $H_7$ therefore take the value of 1. Furthermore, receiver 2 sends a feedback message comprising $BMB_0=11010100$ to transmitter 1, which analyses this message, and, receiver 2 being of ARQ class 0, deduces therefrom that the PDU5 numbered 2, 4, 6, and 7 have not been acknowledged and must therefore be retransmitted. Upon receipt of this feedback message, all the time stamps $H_i$ of PDUs 0 to 7 are deactivated, as well as timer $T_0$.

In frame $f_2$, transmitter 1 retransmits PDU(2) at $t_2+\Delta_2$ and then reactivates $T_0$ for a maximum duration equal to RTTmax, then retransmits PDU(4). Then, $H_2$ and $H_4$ are obtained, activated and equal to 2; the other time stamps $H_i$ of the PDUs of $BMB_0$ are deactivated.

In frame $f_3$, transmitter 1 retransmits PDU(6) and PDU(7), and receiver 2 sends a feedback message containing $BMB_0$, which is not correctly received by transmitter 1. $H_6$ and $H_7$ are then activated at value 3. At $t'_4=t_2+\Delta_2+4$, timer $T_0$ is deactivated. Transmitter 1 must then determine, during a step referenced as 20, which are the PDUs that must be positioned in a queue for subsequent retransmission.

Transmitter 1 then analyses the value, expressed in frames, of the time stamps associated with the various unacknowledged PDUs of $BMB_0$, i.e. PDU(2), PDU(4), PDU(6), and PDU(7). f(t) designates the number of the frame to which belongs time t. For PDUs 2, 4, 6, and 7, the following is obtained:

$$f(t'_4)-H_2=4-2=2 \geq RTTmax$$

$$f(t'_4)-H_4=4-2=2 \geq RTTmax$$

$$f(t'_4)-H_6=4-3=1 < RTTmax$$

$$f(t'_4)-H_7=4-3=1 < RTTmax$$

It is deduced therefrom that PDUs 6 and 7 must not be retransmitted, as they have been sent too recently to be sure that receiver 2 has processed them: indeed, only one frame has passed between their transmission and deactivation of $T_0$. Transmitter 1 then places PDU(2) and PDU(4) in the retransmission queue, and timer $T_0$ is reactivated immediately at:

$$T_0=V(\text{run})+(H_i-H_j)$$

where $V(\text{run})$ is the value of $T_0$ during deactivation thereof, $H_i$ is the time stamp value of the oldest unacknowledged PDU of $BMB_0$ not to be retransmitted, and $H_j$ is the value of the oldest unacknowledged PDU of $BMB_0$ to be retransmitted.

I.e., $T_0=t'_4+(H_6-H_2)*2$ in ms

I.e., $T_0=t'_4+2$ in ms.

Transmitter 1 then retransmits PDU(2) and PDU(4) in frame $f_4$. Consequently, the retransmission queue is empty, and $H_2=H_4=4$ and $H_6=H_7=3$ is obtained. $T_0$ is deactivated in frame $f_5$ at time $t'_5$. Transmitter 1 then reiterates the calculation performed above, in order to determine, during the step referenced as 21, which are the unacknowledged PDUs of $BMB_0$ to be positioned in the retransmission queue:

$$f(t'_5)-H_2=5-4=1 < RTTmax$$

$$f(t'_5)-H_4=5-4=1 < RTTmax$$

$$f(t'_5)-H_6=5-3=2 \geq RTTmax$$

$$f(t'_5)-H_7=5-3=2 \geq RTTmax$$

It is deduced therefrom that PDUs 2 and 4 must not be retransmitted, as the time that has elapsed between their latest transmission and deactivation of $T_0$ is less than RTTmax, and it is therefore possible that these PDUs have not yet been processed by receiver 2: therefore, it seems to be normal for these two PDUs that the transmitter has not received a corresponding feedback message.

PDU(6) and PDU(7) are placed in the retransmission queue, and $T_0$ is immediately reactivated and takes the value defined by the equation above:

$$T_0 = V(\text{run}) + (H_i - H_j)$$

I.e., $T_0 = t'_5 + (H_2 - H_6)*2$ in ms (as PDU(2) is the oldest unacknowledged PDU of $BMB_0$ not to be retransmitted, and PDU(6) is the oldest unacknowledged PDU of $BMB_0$ to be retransmitted)

I.e., $T_0 = t'_5 + 2$ in ms.

In frame $f_5$, transmitter 1 retransmits PDU(6). The retransmission queue then only contains PDU(7), and $H_2 = H_4 = 4$, $H_6 = 5$, and $H_7 = 3$ is obtained. Transmitter 1 then receives a feedback message comprising $BMB_0 = 11011110$ from receiver 2. All time stamps associated with PDUs 0 to 7 are then deactivated, and PDU(7) and PDU(2) are positioned in the retransmission queue.

In frame $f_6$, PDU(7) is retransmitted at time $t_6 + \Delta_6$, and $T_0$ is reactivated and takes the value $T_0 = t_6 + \Delta_6 + 4$. $H_7$ is also reactivated and takes the value 6, and PDU(7) is deleted from the retransmission queue.

In frame $f_7$, transmitter 1 transmits PDU(2), $H_2$ is then activated and takes the value 7, and the retransmission queue is then empty. Receiver 2 sends a feedback message containing $BMB_0 = 11111111$ acknowledging all of PDUs 0 to 7, but that a transmission incident is preventing correct reception by transmitter 1.

At time $t'_8$, in frame $f_8$, $T_0$ is deactivated. Transmitter 1 must then determine, during the step referenced as 22, which are the unacknowledged PDUs of $BMB_0$ that must be positioned in the retransmission queue. For this purpose, it analyses the value of the time stamps associated with PDU(2) and PDU(7), in order to determine the time that has elapsed between the latest transmission of these PDUs and deactivation of $T_0$:

$$f(t'_8) - H_2 = 8 - 7 = 1 < \text{RTTmax}$$

$$f(t'_8) - H_7 = 8 - 6 = 2 \geq \text{RTTmax}$$

Only PDU(7) is placed in the retransmission queue, as it has been sent a sufficiently long time ago for receiver 2 to have processed and acknowledged it. A missing feedback message for PDU(7) therefore indicates a possible transmission error.

Timer $T_0$ is immediately reactivated and takes the value $T_0 = t'_8 + (H_2 - H_7)*2$ in ms, i.e. $T_0 = t'_8 + 2$.

In frame $f_8$, transmitter 1 receives a feedback message comprising bitmap block $BMB_0 = 11111111$, indicating that receiver 2 has correctly received all PDUs with sequence numbers 0 to 7. All time stamps $H_0$ to $H_7$ are then deactivated, as is timer $T_0$.

The mechanisms implemented by the ARQ transmitter and receiver in FIG. 4 are similar to those illustrated in FIG. 3, and therefore, they are not described in further detail in this document. FIG. 4 shows an ARQ class 0 transmitter and receiver, for which the RTTmax duration is fixed at 10 frames, i.e. 20 ms as part of the HiperLAN/2 ARQ protocol.

It will be noted that at the end of the step referenced as 31, it is determined that PDU(0) must be positioned in the retransmission queue for subsequent retransmission. However, in the same frame $f_{11}$, and before it has been possible to retransmit PDU(0), transmitter 1 receives a feedback message from receiver 2 comprising bitmap block $BMB_0 = 11111111$, indicating that receiver 2 has correctly received PDU(0). Transmitter 1 therefore detects that it is not necessary to retransmit PDU(0) and implements a step 30 of deleting PDU(0) from the retransmission queue.

Figure 5:
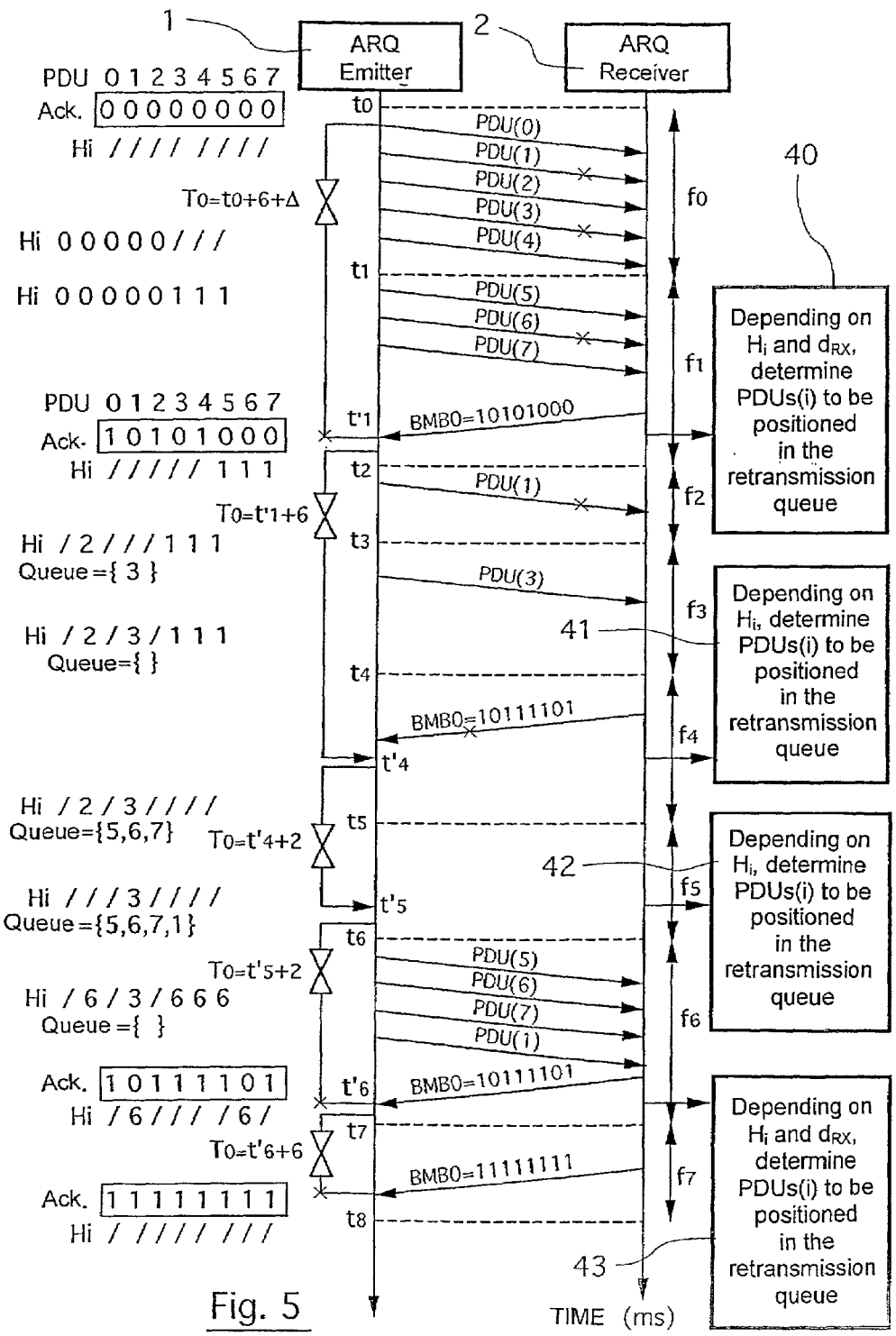
FIG. 5 shows a sample PDU transmission between an ARQ class 0 transmitter and an ARQ class 1 receiver, according to a similar embodiment as in FIGS. 3 and 4.

Referring to FIG. 5, we are now going to describe a sample implementation of the invention as part of data packet (PDU) exchanges between an ARQ class 0 transmitter and an ARQ class 1 receiver. $d_{RX} = 1$ (expressed in frames) designates the processing time of ARQ class 1 receiver. Suppose that RTTmax=3 frames, i.e. 6 ms, and frames $f_0$ to $f_7$ are considered, during which PDU(0) to PDU(7) are transmitted. Timer $T_0$ is associated with bitmap block $BMB_0$, and a time stamp $H_i$ is associated with each PDU(i).

In frame $f_0$, starting at time $t_0$, transmitter 1 transmits PDU(0) to PDU(4). When PDU(0) is transmitted, timer $T_0$ associated with block $BMB_0$ is activated and takes the value $T_0 = t_0 + 6 + \Delta_0$. Time stamps $H_0$ to $H_4$ are activated and take the value 0, thus indicating that PDUs 0 to 4, with whom they are associated, have been transmitted in frame $f_0$.

In frame $f_1$, transmitter 1 then transmits PDUs numbered 5 to 7, and time stamps $H_5$ to $H_7$ are then activated and take the value 1. At time $t'_1$, in frame $f_1$, transmitter 1 receives a feedback message from receiver 2 comprising bitmap block $BMB_0 = 10101000$. When this message is received, timer $T_0$ is deactivated.

Transmitter 1 then implements an analysis of this feedback message, in order to determine, during a step referenced as 40, the unacknowledged PDUs of block $BMB_0$ that are be positioned in the retransmission queue.

This step 40 consists in evaluating the time, expressed in frames, that has elapsed between transmission of a PDU and deactivation of timer $T_0$. For PDU(0) to PDU(4), $f(t'_1) - H_i = 1 \geq d_{RX}$ is obtained. Consequently, it is deduced therefrom that the feedback message received transports the actual state of acknowledgement of PDUs 0 to 4: PDUs 1 and 3 are therefore in unacknowledged state.

On the other hand, for PDU(5) to PDU(7), $f(t'_1) - H_i = 1 - 1 = 0 < d_{RX}$ is obtained. Consequently, it is deduced therefrom that PDUs 5 to 7 cannot be involved by the feedback message received at time $t'_1$. Indeed, given the class of receiver 2, they have been sent too late for the latter to have had the time to receive them, process them and send a corresponding feedback message to transmitter 1 before time $t'_1$.

At the end of step 40, transmitter 1 therefore determines that only PDU(1) and PDU(3) must be positioned in the retransmission queue. Timer $T_0$ is then reactivated immediately and takes the following value:

$$T_0 = V(\text{run}) + (\text{RTTmax} - (f(t'_1) - H_i)),$$

where V(run) is the value of timer $T_0$ when it is deactivated, $f(t'_1)$ is the current time value expressed in frames, and $H_i$ is the value of the time stamp associated with the oldest unacknowledged PDU of $BMB_0$ not to be retransmitted. Thus:

$$T_0 = t'_1 + (\text{RTTmax} - (f(t'_1) - H_5))*2$$

$$T_0 = t'_1 + (3 - (1 - 1))*2$$

$$T_0 = t'_1 + 6 \text{ in ms}$$

is obtained.

The time stamps of PDU(1) and PDU(3) are then deactivated, as are those of PDU(0), PDU(2), and PDU(4), which have actually been acknowledged.

During frame $f_2$, transmitter 1 retransmits PDU(I), which is not received correctly by receiver 2, and time stamp $H_1$ is then activated and takes the value 2. The retransmission queue now only contains PDU(3). In frame $f_3$, transmitter 1 sends PDU(3), the corresponding timer H3 is activated and takes the value 3, and the retransmission queue is now empty.

In frame $f_4$, receiver 2 sends a feedback message comprising $BMB_0=10111101$, but due to a transmission incident, transmitter 1 does not receive it. At time $t'_4$ in frame $f_4$, timer $T_0$ therefore times out after RTTmax. Transmitter 1 then implements a step 41 of determining, depending on the $H_i$ time stamp values of the unacknowledged PDUs, and the ARQ classes of transmitter 1 and receiver 2, the PDU(s) to be positioned in the retransmission queue.

For PDU(1) and PDU(3):

$$f(t'_4)-H_1=4-2=2<\text{RTTmax, and}$$

$$f(t'_4)-H_3=4-3=1<\text{RTTmax}$$

are obtained, respectively.

It is deduced therefrom that PDUs 1 and 3 have been transmitted too recently to be sure that receiver 2 has had time enough to receive them, process them, and send a corresponding feedback message. Consequently, PDU(1) and PDU(3) must not be retransmitted.

On the other hand, for PDUs 5 to 7:

$$f(t'_4)-H_5=4-1=3\geq\text{RTTmax, and}$$

$$f(t'_4)-H_6=4-1=3\geq\text{RTTmax, and}$$

$$f(t'_4)-H_7=4-1=3\geq\text{RTTmax}$$

are obtained.

The time that has elapsed between transmission of each of PDUs 5 to 7 in frame 1, and timer $T_0$ timeout is sufficient for the receiver to have sent a feedback message relating to these PDUs. If this acknowledgement is missing, transmitter 1 makes the decision of positioning PDU(5), PDU(6), and PDU(7) in the retransmission queue.

The corresponding timer $T_0$ is reactivated immediately and takes the value:

$$T_0=V(\text{run})+(H_i-H_j)$$

where V(run) is the value of $T_0$ when it is deactivated, $H_i$ is the time stamp value of the oldest unacknowledged PDU of $BMB_0$ not to be retransmitted, and $H_j$ is the value of the oldest unacknowledged PDU of $BMB_0$ to be retransmitted.

I.e., $T_0=t'_4+(H_1-H_5)*2$ in ms

I.e., $T_0=t'_4+2$ in ms.

Time stamps $H_5$, $H_6$, and $H_7$ are deactivated.

Indeed, PDU(1) is the oldest unacknowledged PDU of $BMB_0$ not to be retransmitted, and PDU(5) is the oldest unacknowledged PDU of $BMB_0$ to be retransmitted.

Suppose e.g. that no transmission resource is assigned to transmitter 1 in frame $f_5$. At time $t'_5$, timer $T_0$ is deactivated after RTTmax without any acknowledgement having been received for the PDUs of $BMB_0$.

Transmitter 1 carries out another step 42 of determining the unacknowledged PDUs to be retransmitted, implementing calculations similar to those exposed above:

$$f(t'_5)-H_1=5-2=3\geq\text{RTTmax, and}$$

$$f(t'_5)-H_3=5-3=2<\text{RTTmax}.$$

Only PDU(1) can then be positioned in the retransmission queue, as the time that has elapsed between transmission of PDU(3) and $T_0$ timeout is too little to be sure that receiver 2 has already been able to process PDU(3).

Therefore, transmitter 1 places PDU(1) in the retransmission queue, which thus contains the sequence numbers of the following PDUs: $\{5,6,7\}\cup\{1\}$.

Timer $T_0$ is immediately reactivated and takes the value:

$$T_0=V(\text{run})+(H_i-H_j) \text{ as above.}$$

I.e. $T_0=t'_5+(H_3-H_1)*2$ in ms

I.e. $T_0=t'_5+2$ in ms.

Time stamp $H_1$ is deactivated, and $H_3$ is thus the only time stamp still active among all the PDUs associated with $BMB_0$.

In frame $f_6$, transmitter 1 has sufficient resources to transmit all the PDUs of the queue. Time stamps $H_1$ and $H_5$ to $H_7$ are then activated and take the value 6, and the retransmission queue is then empty. Moreover, at time $t'_6$, transmitter 1 receives a feedback message comprising $BMB_0$ 10111101, and then deactivates $T_0$.

Upon receipt of $BMB_0$, transmitter 1 implements a step 43 of determining the unacknowledged PDU(s) of $BMB_0$ to be positioned in the retransmission queue. For this purpose, it evaluates the time that has elapsed between transmission of each of the unacknowledged PDUs (in particular PDU(1) and PDU(6)) and deactivation of $T_0$:

$$f(t'_6)-H_1=6-6=0<d_{RX}, \text{ and}$$

$$f(t'_6)-H_6=6-6=0<d_{RX}.$$

Given the ARQ class of receiver 2, PDU(I) and PDU(6) are in principle not involved by the feedback message received at $t'_6$. It is not necessary to position them in the retransmission queue. Timer $T_0$ is immediately reactivated and takes the value:

$$T_0=V(\text{run})+\text{RTTmax}-(f(t'_6)-H_i)),$$

where V(run) is the value of timer $T_0$ when it is deactivated, $f(t'_6)$ is the current time value expressed in frames, and, $H_i$ is the time stamp value associated with the oldest unacknowledged PDU of $BMB_0$ not to be retransmitted. Thus:

$$T_0=t'_6+(\text{RTTmax}-(f(t'_6)-H_1))*2$$

$$T_0=t'_6+(3-(6-6))*2$$

$$T_0=t'_6+6 \text{ in ms}$$

is obtained.

The time stamps of positively acknowledged PDUs 5 and 6 are deactivated.

In frame $f_7$, transmitter 1 receives another feedback message comprising $BMB_0$ 11111111, which allows deactivation of $T_0$ and indicates that all PDUs associated with $BMB_0$ have been correctly acknowledged. All corresponding time stamps are deactivated.

The invention claimed is:

1. A method for transmitting data between a transmitter and a receiver, comprising:
   transmitting packets of data by said transmitter;
   receiving at the transmitter a feedback message from said receiver, the feedback message including a bitmap block including a predetermined plural number of fields associated with corresponding said packets of data, each field of said fields representing a consecutive identifier corresponding to each packet of the transmitted packets and indicative of a state of acknowledgement of each packet of said packets;

associating a timer with a periodic reception of the bitmap block at the transmitter;

deactivating said timer after a maximum duration, and then considering said packets associated with said bitmap block to be in an unacknowledged state by said transmitter; and after deactivating said timer, and when at least one packet associated with said bitmap block is in said unacknowledged state, positioning at least some unacknowledged packets associated with said bitmap block in a retransmission queue.

2. The method according to claim 1, further comprising activating said timer when said transmitter sends to said receiver a first of said packets having consecutive identifiers associated with said bitmap block, and switching said timer to an activated state.

3. The method according to claim 1, wherein said receiving includes receiving said feedback message including said bitmap block with every field indicating the state of acknowledgement as acknowledged.

4. The method according to claim 1, further comprising deactivating said timer when said transmitter receives a cumulated acknowledgement of said packets associated with said bitmap block, indicating that said packets associated with said bitmap block are in said acknowledged state.

5. The method according to claim 1, further comprising deactivating said timer, when said transmitter receives a feedback message including said bitmap block.

6. The method according to claim 5, further comprising:

upon the transmitter receiving said feedback messages analyzing said feedback message to determine said acknowledged or unacknowledged state of each of said packets associated with said bitmap block.

7. The method according to claim 6, further comprising: after analyzing said feedback message, for each of said acknowledged packets associated with said bitmap block, deactivating a time stamp associated with at least some packets in said unacknowledged state.

8. The method according to claim 1 further comprising:

analyzing said feedback message to determine said acknowledged or unacknowledged state and checking for a presence, in said retransmission queue, of at least one acknowledged packet associated with said bitmap block, and when the presence in said queue of at least one acknowledged packet of said block has been confirmed, deleting said at least one of said acknowledged packets associated with said bitmap block from said retransmission queue.

9. The method according to claim 1, further comprising: retransmitting said packet(s) of said block positioned in said retransmission queue, and activating said timer associated with said block when a first of said packets associated with said bitmap block positioned in said queue is retransmitted.

10. The method according to claim 1, further comprising: communicating with an ARQ (Automatic Repeat Request) protocol.

11. The method according to claim 1, further comprising: associating a time stamp with at least some packets in said unacknowledged state.

12. The method according to claim 11, further comprising:

activating said time stamp when said transmitter sends said associated packet.

13. The method according to claim 1, wherein said positioning includes sub-selecting packets to be positioned in said queue, depending on a selection criterion.

14. The method according to claim 13, wherein said selection criterion takes into account at least one of a value of a time stamp associated with an unacknowledged packet associated with said block and an ARQ class of said receiver.

15. The method according to claim 13, wherein said sub-selecting includes selecting an unacknowledged packet associated with said block and associated with a time stamp having a value greater than or equal to said maximum duration.

16. The method according to claim 11, wherein said positioning includes for each of said selected packets, deactivating said associated time stamp.

17. The method according to claim 9, wherein when all unacknowledged packets associated with said bitmap block have been selected in said sub-selecting, said timer takes a value V(T) wherein, $$V(T)=t(\text{activation})+d_{max},$$

where t (activation) is a current time value, and where $d_{max}$ is said maximum duration, wherein the timer associated with each packet of the bitmap block positioned in said queue is activated and takes the current time value during said retransmission of said packet.

18. The method according to claim 15, further comprising:

after deactivating said timer, if at least one unacknowledged packet of said block, associated with said time stamp having a value of less than said predetermined maximum duration, has not been selected during said sub-selecting, activating said timer of said bitmap block, so that said timer takes a value V(T):

$$V(T)=V(\text{run})+(\text{Time stamp}(i)-\text{Time stamp}(j)),$$

where V(run) is the value of said timer during said timer running in said deactivated state, Time stamp(j) is the greater value of said time stamps associated with said unacknowledged packets associated with said bitmap block selected during said sub-selecting, and Time stamp(j) is the greater value of said time stamps associated with said unacknowledged packets associated with said bitmap block not selected during said sub-selecting.

19. The method according to claim 14, further comprising:

after deactivating said timer, if at least one unacknowledged packet of said bitmap block has not been selected during said sub-selecting depending on a decision criterion related to the ARQ class of said receiver, activating said timer of said block so that said timer takes a value V(T):

$$V(T)=V(\text{run})+(d_{max}-(t-\text{Time stamp}(i))),$$

where V(run) is a value of said timer during said timer running in said deactivated state, $d_{max}$ is said maximum duration, t is a current time value, and Time stamp (i) is the greater value of said time stamps associated with said unacknowledged packets associated with said bitmap block not selected during said sub-selecting.

* * * * *